US008386793B2

(12) United States Patent
Wang et al.

(10) Patent No.: US 8,386,793 B2
(45) Date of Patent: Feb. 26, 2013

(54) METHOD AND APPARATUS FOR IMPLEMENTING ELECTRONIC SEAL

(75) Inventors: Donglin Wang, Beijing (CN); Ningsheng Liu, Beijing (CN)

(73) Assignee: Sursen Corp., Beijing (CN)

( * ) Notice: Subject to any disclaimer, the term of this patent is extended or adjusted under 35 U.S.C. 154(b) by 573 days.

(21) Appl. No.: 12/622,618

(22) Filed: Nov. 20, 2009

(65) Prior Publication Data

US 2010/0082994 A1    Apr. 1, 2010

(30) Foreign Application Priority Data

May 25, 2007  (CN) .......................... 2007 1 0099654
May 26, 2008  (CN) ................. PCT/CN2008/071084

(51) Int. Cl.
*H04L 9/32*    (2006.01)

(52) U.S. Cl. ........ 713/180; 713/155; 713/176; 713/165; 713/167; 713/168; 713/186; 713/189; 713/181; 713/193; 380/28; 380/37; 726/26; 726/27; 705/62; 358/3.28

(58) Field of Classification Search ................... 713/176
See application file for complete search history.

(56) References Cited

U.S. PATENT DOCUMENTS

| 2002/0194484 | A1* | 12/2002 | Bolosky et al. | 713/189 |
| 2005/0267844 | A1* | 12/2005 | Gallant et al. | 705/51 |
| 2008/0010461 | A1* | 1/2008 | Holden et al. | 713/176 |

FOREIGN PATENT DOCUMENTS

| CN | 1547344 | 11/2004 |
| CN | 1829149 | 9/2006 |

* cited by examiner

*Primary Examiner* — Nathan Flynn
*Assistant Examiner* — Bryan Wright
(74) *Attorney, Agent, or Firm* — David Xue; Goodwin Procter LLP

(57) ABSTRACT

A method provided herein includes the following steps: storing seal data of an electronic seal, a digital certificate, electronic signature program and a private key of a sealer in an external portable apparatus; performing a Hash conversion to a file to be sealed and the seal data of the electronic seal to generate a data digest, wherein the file to be sealed is a layout file; sealing, in the portable apparatus, the data digest using the private key of the sealer and the electronic signature program to generate an electronic signature result; and combining the file to be sealed, the seal data of the electronic seal, the digital certificate and the electronic signature result to generate a seal combination file.

19 Claims, 4 Drawing Sheets

METHOD AND APPARATUS FOR IMPLEMENTING ELECTRONIC SEAL

CROSS-REFERENCE TO RELATED APPLICATIONS

This application claims the benefit of PCT/CN2008/071084 filed May 26, 2008, which is the PCT filing of CN 200710099654.4 filed May 25, 2007, both of which applications are fully incorporated herein by reference.

FIELD OF THE INVENTION

The present invention relates to digital signature authentication techniques, and more particularly, to method and apparatus for implementing an electronic seal.

BACKGROUND OF THE INVENTION

In many countries, including the United States, the European Union and China, electronic signatures have the same legal effectiveness as traditional signatures or seals on paper.

Electronic seal simulates a traditional physical seal utilizing digital technologies. The management and usage of the electronic seal accord with those of the physical seal. Electronic files sealed with the electronic seal have the same appearance, validity and usage manner with paper files sealed with the physical seal.

The Electronic Signature Law requires that an electronic signature is valid in law only when it meets the following requirements:

(1) When the creation data of the electronic signature are used for electronic signature, it exclusively belongs to an electronic signatory;

(2) When the signature is entered, the creation data of the electronic signature is controlled only by the electronic signatory;

(3) After the signature is entered, any alteration to the electronic signature can be detected;

(4) After the signature is entered, any alteration to content or form of the electronic file can be detected.

In the European Union, the EU Electronic Signatures Directive was published in the EC Official Journal, as Directive 1999/93/EC of the European Parliament and of the Council of 13 Dec. 1999 on a Community framework for electronic signatures. In the United States, the definition of what qualifies as an electronic signature is wide and is set out in the Uniform Electronic Transactions Act (UETA) released by the National Conference of Commissioners on Uniform State Laws (NCCUSL) in 1999. From the laws of EU and US, it can be seen that if an electronic signature obtained by a technical scheme satisfies the Chinese digital signature law, it is also able to satisfy the EU Electronic Signatures Directive and Uniform Electronic Transactions Act.

In prior art, however, many hidden troubles exist in circulation of the electronic file. For example, the electronic file may be juggled during working process, the signature and seal of the electronic file may be fabricated. Thus, the requirements of the Electronic Signature Law are hard to be satisfied in the prior art, e.g., certain alterations to the content or form of the electronic file and the electronic signature after the electronic file is sealed with the electronic seal cannot be detected in the prior art.

SUMMARY OF THE INVENTION

Embodiments of the present invention provide method and apparatus for implementing an electronic seal, so as to meet all requirements of the Electronic Signature Law.

According to one aspect of the present invention, a method for implementing an electronic seal is provided. Seal data of an electronic seal, a digital certificate, electronic signature program, and a private key of the sealer are stored in an external portable apparatus. The method includes:

performing a Hash conversion to a file to be sealed and the seal data of the electronic seal to generate a data digest, wherein the file to be sealed is a layout file;

signing, in the portable apparatus, the data digest using the private key of the sealer and the electronic signature program to generate an electronic signature result; and combining the file to be sealed, the seal data of the electronic seal, the digital certificate and the electronic signature result to generate a sealed combination file.

According to another aspect of the present invention, an apparatus for implementing the electronic seal is provided. The apparatus includes: a portable apparatus, a client apparatus; wherein the portable apparatus comprises: a storage module, a microprocessor, an input/output interface; the client apparatus comprises: a data digest generation unit and a sealing combining unit;

the storage unit is adapted to store seal data of a seal, a digital certificate, electronic signature program and a private key of a sealer;

the data digest generation unit is adapted to perform a Hash conversion to a file to be sealed and the seal data of the electronic seal to generate a data digest; wherein the file to be sealed is a layout file;

the microprocessor is adapted to sign the data digest generated by the data digest generation unit using the private key and the electronic signature program stored in the storage module to generate an electronic signature result;

the sealing combining unit is adapted to combine the electronic signature result generated by the microprocessor, the seal data of the electronic seal and the digital certificate in the storage module to generate a seal combination file;

the input/output interface is adapted to implement data exchange between the portable apparatus and the client apparatus.

According to yet another aspect of the present invention, a client apparatus is provided. The client apparatus includes:

a data digest generation unit, adapted to perform a Hash conversion to a file to be sealed and a seal data of a electronic seal to generate a data digest; wherein the file to be sealed is a layout file and the seal data of a electronic seal is stored in a portable apparatus;

a sealing combining unit, adapted to combine an electronic signature result generated through signing the data digest generated by the data digest generation unit using a private key and electronic signature program stored in the portable apparatus, as well as the seal data of the electronic seal and a digital certificate stored in the portable apparatus to generate a seal combination file.

In the electronic sealing technique provided by embodiments of the present invention, the creation data of the electronic signature, including the seal data, the digital certificate, the electronic signature program and the private key of the sealer, is stored in the portable apparatus and managed by the sealer. As such, it is ensured that the creation data of the electronic signature is private to the sealer when used for electronic signature. The private key of the sealer is stored in the portable apparatus and the signing of the data digest is accomplished in the portable apparatus, which ensures that the creation data of the electronic signature is controlled only by the sealer and further ensures that any alteration to the electronic seal can be detected. The file to be sealed is converted into a layout file and all layout information is recorded in the file to be sealed. Thus any alteration to the content or the form of the file to be sealed can be detected. Therefore, the electronic sealing technique provided by embodiments of the present invention can meet all the requirements of the China Electronic Signature Law, EU Electronic Signatures Directive and Uniform Electronic Transactions Act to the electronic signature.

DETAILED DESCRIPTION OF THE INVENTION

To make the objective, technical solution and merits of the present invention clearer, the present invention will be described hereinafter in detail with reference to accompanying drawings and embodiments.

An electronic seal is not a simple combination of a seal image and an electronic signature. It has the following basic features:

1. No new concepts such as certificate, Certificate Authority (CA) are involved in the whole usage procedure of the electronic seal. The electronic signature technology is completely hid behind the electronic seal, so that people can use the electronic seal based on their daily experiences.

2. The electronic seal is ensured to be an express of a valid signature, i.e., the electronic seal is displayed normally only when the validity of the electronic file is verified by the electronic signature technology. It is not only necessary to protect the content data of the electronic file using the electronic signature technology but also necessary to protect the electronic seal itself to avoid the situation that a legal electronic seal is displayed on an illegal electronic file after being embezzled.

3. One physical seal corresponds only to one electronic seal, so as to avoid the confusion in seal management.

4. The electronic seal must be stored in portable medium, so that the portable medium storing the electronic seal corresponds to a physical seal and is convenient to keep.

5. In order to make the electronic files sealed with the electronic seal have the same appearance and characteristics with paper files, digital paper technologies must be utilized. The digital paper technology is a technical platform with features of traditional papers based on digital technologies. It not only has abilities for describing page layout but also is capable of anti-juggling and anti-dividing. The capability of anti-juggling ensures the sealed file not being juggled. And the capability of anti-dividing ensures that anyone cannot divide the electronic seal from the sealed file and then seal other files using the electronic seal.

In embodiments of the present invention, a Hash conversion is performed to the file to be sealed and the seal data by the sealer to generate a data digest; wherein the file to be sealed is a layout file. The data digest is signed using the private key of the sealer to generate an electronic signature result in the portable apparatus. The file to be sealed, the seal data and the electronic signature result are combined to generate a sealed combination file. A seal verifier verifies the validity of the electronic seal and the integrity of the file to be sealed according to the sealed combination file, and displays the sealed file if the verification succeeds.

Figure 1:
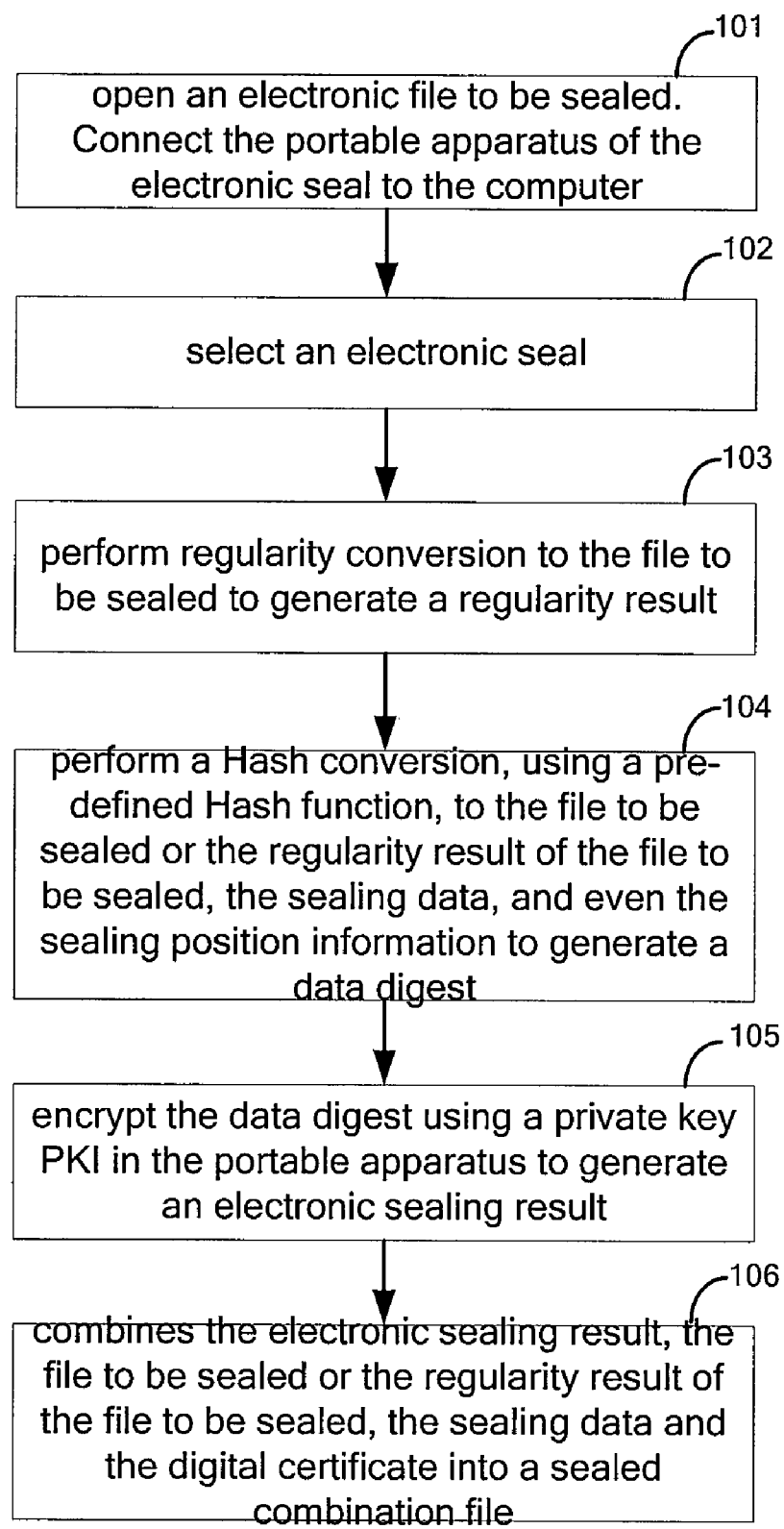
FIG. 1 is a flowchart illustrating a method for implementing an electronic seal according to an embodiment of the present invention.

FIG. 1 is a flowchart illustrating a method for implementing an electronic seal according to an embodiment of the present invention. An application program for sealing using the electronic seal is installed in a computer system of the sealer. The application program and the portable apparatus complete the seal of the electronic file together.

The portable apparatus stores the seal data of at least one electronic seal. The electronic seal may be anyone or any combination of a seal image, a character and a graphics. The seal data includes the electronic seal, seal meta-data, sealer information, and an electronic signature generated by signing the electronic seal and the seal meta-data with the private key of the sealer.

The portable apparatus is owned by the sealer, which ensures that only the sealer can use the portable apparatus. In order to ensure the privacy of the portable apparatus to the sealer, an access password may be set for the portable apparatus and the electronic seal respectively. Only when the access passwords are correctly entered, the access to the portable apparatus and the electronic seal is allowed.

The access password for the portable apparatus, also referred to as a user password, is generally set by a third party, e.g. a manufacture of the portable apparatus, when the portable apparatus is produced. The sealer may modify the user password. The user password improves the security of data stored in the portable apparatus.

The access password for the electronic seal, also referred to as a sealing password, may be set by the sealer. Users having access privilege of different electronic seals may use the corresponding electronic seal according to their privilege. In order to avoid the electronic seal being illegally obtained through printing a computer screen, the electronic seal is processed to be blurry by sealing program when being displayed.

The above may be written into an agreement with force affect, i.e., the name of the owner of the portable apparatus should accord with the signatory of the agreement, the signatory of the agreement should promise to keep well the portable apparatus and take the law aftermath, and the agreement information may also be recorded in a seal usage record.

As shown in FIG. 1, the method for implementing the electronic seal includes the following steps:

Step 101: an electronic file to be sealed is opened. If the electronic file to be sealed is not a layout file, the file to be sealed is converted into a layout file, e.g. PDF, WDL, CEB, SEP or other standard formats. The layout file has the following features:

1. The layout file has the same express ability with paper printed files, i.e., the layout file always has the same appearance when displayed on different computers. But non-layout files, such as Word, may be displayed differently on different computers.

2. It realizes format unity of multiple types of data files.

3. It accords with the trend of informationization development and is convenient for spread. The layout file has flexible functions to meet different kinds of requirements, e.g., flexible file generation and conversion functions, good display capabilities, supporting file exchange and printout, supporting archive management, convenient for storage and usage, etc.

4. The layout file provides digital security. It supports secrecy techniques such as software/hardware encryption, digital signature, etc.

Basic layout objects of each page of the file to be sealed is recorded directly or indirectly, such as position information of characters, pictures, and all referenced resources except a standard font, e.g. information of an image and a non-standard font.

In the direct recording manner, position coordinates of the basic layout objects such as characters, graphics and images may be recorded. The position coordinates record an absolute position of each basic layout object. Generally, the absolute position refers to a position of the basic layout object in an XY coordinate system (i.e. the Cartesian coordinate system).

In the indirect recording manner, coordinates of beginning basic layout object may be, recorded. The coordinates of the beginning basic layout object are also referred to as absolute coordinates. Then relative position spaces between other basic layout objects and the beginning basic layout object are recorded. For example, given coordinates of a first character in a string and a space between every two characters, position of each subsequent character may be calculated through adding the corresponding space to coordinate X of the first character. During this procedure, coordinate Y remains unchanged. For characters such as Chinese which have equally spaces between every two characters, it is possible to record only one space for one string. Alternatively, coordinate Y of the characters may be seen as a graphic status, thus only coordinate X is required for describing each character.

All the referenced resources except the standard font may include resources being referenced such as images and the non-standard font. The non-standard font includes a font which includes characters outside the standard font, e.g., user defined characters, special symbols, etc.

Step 102: the sealer selects a required electronic seal from the portable apparatus and drags the selected electronic seal to a sealing position of the file to be sealed. At this time, the sealing position (i.e., the position information of the electronic seal on the file to be sealed, the sealing position is designated by the sealer) is recorded. Before accessing the portable apparatus, the user has to enter the user password. And before selecting the electronic seal, the user needs to enter the password for using the electronic seal. Only when the two passwords are correctly entered, the user can be regarded as a legal sealer.

Step 103: regularity conversion is performed on the file to be sealed. The regularity refers to organize content data of the file to be sealed according to a certain rule or format. The regularity result only depends on the content of the file and is irrelevant to the storage manner or display manner of the file.

For example, a same paragraph of content data in the file may be stored in different manners, wherein in the first manner, the content data is stored in an XML format:

```
<doc>
    <title> a paragraph of characters </title>
    <author> ZhangSan </author>
    <content> this is a paragraph of characters </content>
</doc>
```

Since the content data stored in the XML format has no sequence limitation, the meaning expressed as the following is the same as that expressed above:

```
<doc>
    <author> ZhangSan </author>
    <title> a paragraph of characters </title>
    <content> this is a paragraph of characters </content>
</doc>
```

The second manner is to store the content data in ini format of Windows as follows:

[doc]
Title=a paragraph of characters
Author=ZhangSan
Content=this is a paragraph of characters The third manner is to store the content data in binary format.

05 67 48 34 . . . the first 8 bytes represent the title "a paragraph of characters";

04 69 38 23 . . . these bytes represent the author "ZhangSan";

89 23 56 33 98 . . . these bytes represent the content "this is a paragraph of characters".

The above three manners for storing the content data are equivalent in their semantic. The difference only relies in the storage manner of the content data. If the above three files are signed simply, the files will become different after being signed.

The regularity is to take aside the storage manner of the content data. The file is regularized firstly before the Hash conversion or the electronic signature, and then the Hash conversion or the electronic signature is performed on the regularity result.

The above three manners, according to a pre-defined organization rule, e.g., connecting the content data of Title, Author and Content in sequence to form a string "ZhangSan a paragraph of characters this is a paragraph of characters". No matter how the content data are stored, the electronic signature is implemented based on the content formed according to the above sequence.

It can be seen from the above described situations that, files having the same meaning but different storage and display manners may have the same regularity result after the regularity conversion.

In the above three steps, it is only necessary to ensure that step 101 is performed before step 103.

Step 104: a Hash conversion is performed, using a pre-defined Hash function, on the file to be sealed (or the regularity result of the file to be sealed), the seal data, and even the sealing position information to generate a data digest. And the data digest is sent to the portable apparatus.

Herein, a time stamp may also be sent to the portable apparatus. The time stamp may be generated as follows: the sealer sends the data digest to a third party. The third party signs the data digest and the time of the third party to generate the time stamp. The time stamp is a reliable way to provide time information.

Step 105: the portable apparatus encrypts the data digest using a private key of the sealer according to pre-stored electronic signature program to generate an electronic signature result. The encryption is finished in the portable apparatus instead of a computer, since if the encryption is finished in the computer, the private key or the data digest may be filched.

The portable apparatus stores a key generation program. The private key of the sealer is generated by triggering the key generation program in a special manner when the seal data is created. The private key is stored in the portable apparatus. It is prohibited to be exported and also prohibited to be stored in the computer memory of a client during the usage. This ensures the security of the private key, i.e. the private key cannot be copied or modified. When triggering the key generation program to generate public and private key pairs, seeds for generating the public and private key pairs may be treated differently at different time, for example, time or prime numbers may be used as seeds for generating public and private pairs, so as to ensure that the public and private pairs generated for different sealer are different.

The portable apparatus encrypts the data digest and the time information to generate an electronic signature result. The time information may be the time stamp information from the third party or local time information.

The pre-defined electronic signature algorithm may be Rivest, Shanir&Adleman (RSA), or Data Encryption Standard (DES), or 3DES, or state-secret specialized algorithm (SSF33), or Elliptic Curves Cryptography (ECC).

Step 106: the sealing program reads in the electronic signature result, combines the electronic signature result, the file to be sealed (or the regularity result of the file to be sealed), the seal data and the digital certificate to generate a sealed combination file. At this time, the file to be sealed is sealed by the sealing program.

The digital certificate includes information such as a sequence number of the certificate, a CA sequence number of the electronic seal, validity period of the digital certificate and name of a department which issues the certificate. The digital certificate may also include the public key of the sealer which is randomly generated by the key generation program in the portable apparatus and is corresponding to the private key of the sealer. The digital certificate may also be a part of the seal data.

In embodiments of the present invention, each time the sealing process is finished, seal usage information may be recorded in the portable apparatus, wherein the seal usage information may include the time the seal being used, usage times and data digest, etc.

If what is included in the sealed combination file is an un-regularized file, the un-regularized file is one of standard layout files such as PDF, SEP, WDL and CEB which are supported by operating systems. And the un-regularized file supports UOML standard. This kind of standard layout file includes all the referenced resources except the standard font, e.g., pictures, user defined characters, etc, and includes position information of characters, graphics and images. Therefore, any alteration to the content or the form of the sealed combination file can be detected.

If what is included in the sealed combination file is the regularity result of the file to be sealed, after the Hash conversion is performed on the seal data and the regularity result of the file to be sealed by using the Hash function and after the data digest is encrypted by using the private key, any alteration to the sealed combination file can be detected.

Figure 2:
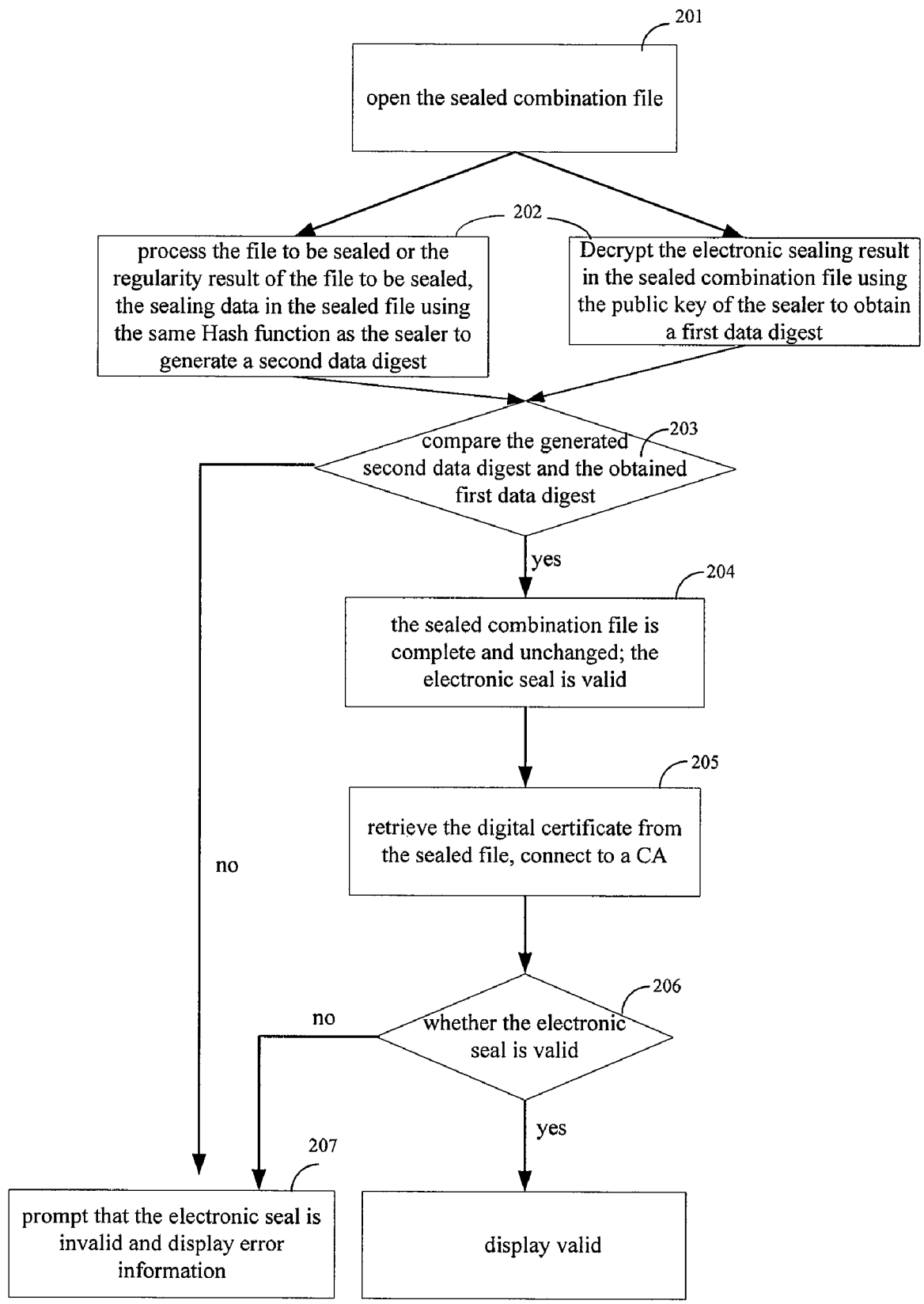
FIG. 2 is a flowchart illustrating a method for verifying an electronic seal according to an embodiment of the present invention.

FIG. 2 is a flowchart illustrating the display and verification of the seal according to an embodiment of the present invention. A seal verifier needs to verify the file sealed, display and determine the validity and integrity of the electronic seal using a program corresponding to the sealing program. As shown in FIG. 2, when a sealed combination file is received from the sealer, the steps performed at the verifier include:

Step 201: the sealed combination file is opened, the file to be sealed or the regularity result of the file to be sealed in the sealed combination file is displayed, and the electronic seal is displayed.

Step 202: the file to be sealed (or the regularity result of the file to be sealed) and the seal data in the sealed combination file is processed using the same Hash function as the sealer to generate a second data digest. The electronic signature result in the sealed combination file is decrypted using the public key of the sealer to obtain a first data digest. The order for generating the second data digest and obtaining the first data digest is optional. The public key of the sealer may be sent to the verifier in the digital certificate or through other ways, e.g., storing the public key of the sealer who exchanges files constantly in the system environment.

Step 203: the generated second data digest and the obtained first data digest are compared. If the second data digest and the first data digest are the same, proceed to step 204; otherwise, it indicates that the sealed combination file has been modified or the content of the electronic file is incomplete, proceed to step 207.

Step 204: a note that the sealed combination file generated by the verifier and the sealed combination file generated by the sealer are the same, i.e., the sealed combination file has not been modified and is complete, is prompted.

Step 205: the digital certificate is retrieved from the sealed combination file and the CA is connected.

Step 206: the certificate sequence number of the digital certificate is searched from the database of the CA. If there is the certificate sequence number in the database of the CA, it indicates that the digital certificate is valid.

In case that the digital certificate is valid, a CA sequence number of the electronic seal in the digital certificate is searched from the database of the CA. If there is the CA sequence number of the electronic seal in the database of the CA, it indicates that the CA sequence number of the electronic seal is valid.

If there is no such CA sequence number in the database of the CA, the verifier may further determine whether the electronic seal has been reported loss. If the electronic seal has been reported loss, the verifier further determines whether the time the electronic seal being reported loss is later than that the electronic seal was used for sealing the electronic file. If the electronic seal is reported loss after being used for sealing the electronic file, the CA sequence number of the electronic seal is regarded still valid.

Certainly, the validity of the certificate sequence number of the digital certificate and the validity of the CA sequence number of the electronic seal may be verified at the same time. If both the sequence number of the digital certificate and the sequence number of the electronic seal are valid, it is determined that the electronic seal is valid; otherwise, it is determined that the electronic seal is invalid, proceed to step 207.

Step 207: a note that the sealed combination file is illegal or invalid is prompted. In practice, it is possible to display a cross on the electronic seal to indicate that the electronic seal is invalid.

Figure 3:
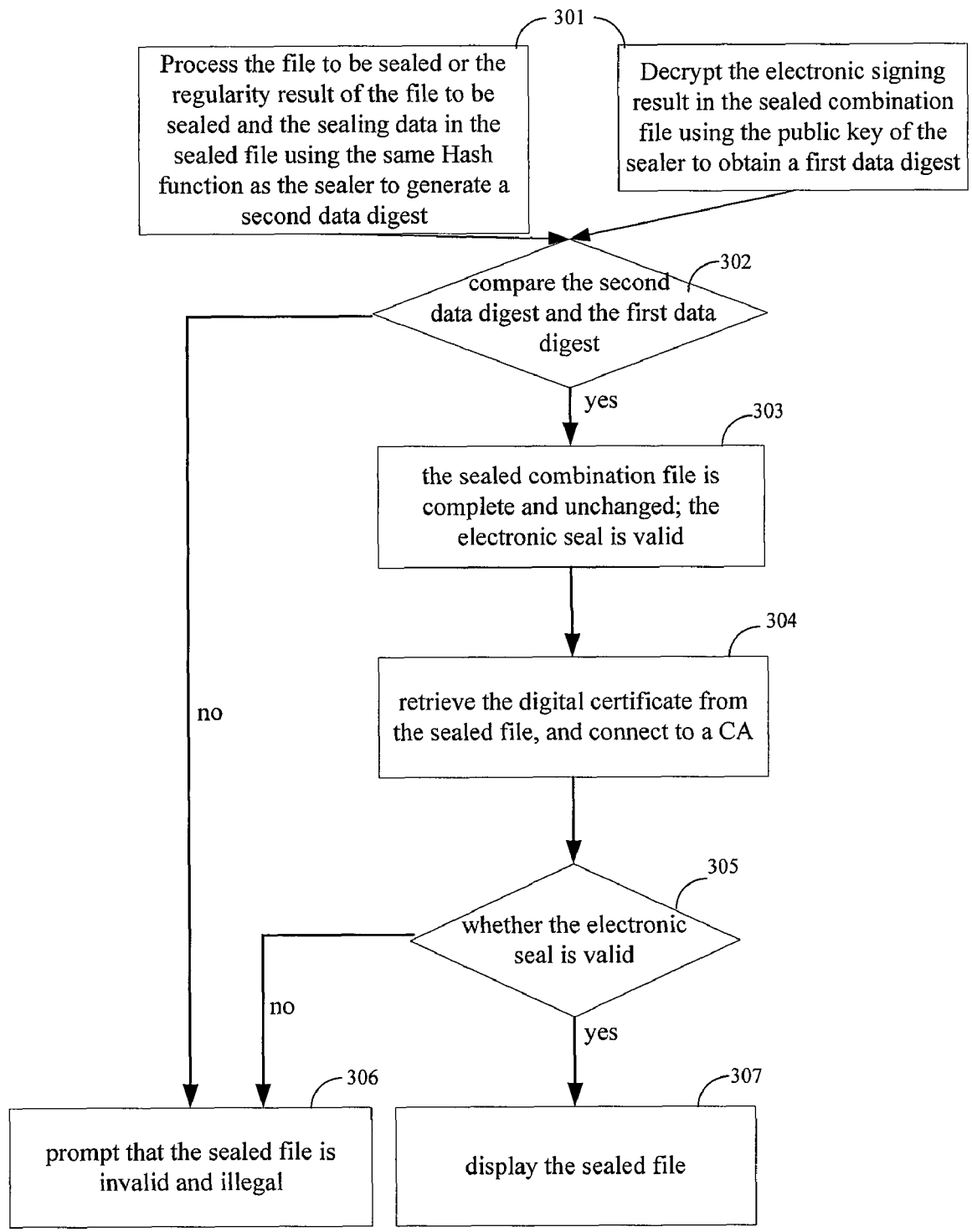
FIG. 3 is a flowchart illustrating a method for verifying an electronic seal according to another embodiment of the present invention.

FIG. 3 is a flowchart illustrating a method for displaying and verifying the electronic seal according to another embodiment of the present invention. In this embodiment, the validity and integrity of the electronic seal is verified firstly by the verifier and then a sealed file is displayed.

Step 301: the sealed combination file is opened. The electronic signature result in the sealed combination file is decrypted using the public key of the sealer to obtain a first data digest. The file to be sealed (or the regularity result of the file to be sealed) and the seal data in the sealed combination file is processed using the same Hash function as the sealer to generate a second data digest.

Step 302: the second data digest and the first data digest are compared. If they are the same, proceed to step 303; otherwise, it indicates that the sealed, combination file has been modified or the content of the electronic file is incomplete, proceed to step 306.

Step 303: a note that the sealed combination file received by the verifier and the sealed combination file generated by the sealer are the same, i.e., the sealed combination file has not been modified and is complete, is prompted.

Step 304: the digital certificate is retrieved from the sealed combination file, and a CA is connected.

Step 305: the certificate sequence number of the digital certificate is searched from the database of the CA. If there is the certificate sequence in the database of the CA, it indicates that the digital certificate is valid.

At the same time, the CA sequence number of the electronic seal in the digital certificate is searched from the database of the CA. If there is the CA sequence number of the electronic seal in the database of the CA, it indicates that the CA sequence number of the electronic seal is valid.

If the digital certificate includes a validity period of the electronic seal and the sealed combination file includes time information, when verifying the validity of the electronic seal, it is also possible to compare the validity period of the electronic seal with the time information in the sealed combination file and to determine whether the electronic seal is still in its validity period. If the sealing time is in the validity period of the digital certificate and there exist the certificate sequence number of the digital certificate in the database of the CA, it indicates that the digital certificate is valid.

If the CA sequence numbers of both digital certificate and the electronic seal are valid, it indicates that the electronic seal is valid, proceed to step 307; otherwise, it indicates that the electronic seal is invalid, proceed to step 306.

Both the sequence number of the electronic seal and the sequence number of the digital certificate may be revoked. If their validity keeps consistently in operation, both of them should be valid or revoked at the same time.

Step 306: a note that the sealed combination file is invalid and illegal is prompted and the procedure is ended.

Step 307: the sealed file is displayed.

In the sealing technique provided by embodiments of the present invention, the creation data of the electronic signature is stored in the portable apparatus and is managed by the sealer, which ensures the privacy of the creation data of the electronic signature. The private key of the sealer is also stored in the portable apparatus and prohibited to be exported or copied. This ensures that the creation data of the electronic signature is controlled only by the sealer. Signing the data using the private key of the sealer, verifying the electronic signature using the public key of the sealer and comparing with the data digest of the sealed file ensure that any alteration to the file can be detected. Converting the file to be sealed into the layout file and recording all layout information in the file to be sealed, especially the position information, ensure any alteration to the content or the format of the file to be sealed can be detected. Therefore, the sealing technique provided by embodiments of the present invention meets all the requirements of the China Electronic Signature Law, EU Electronic Signatures Directive and Uniform Electronic Transactions Act.

Figure 4:
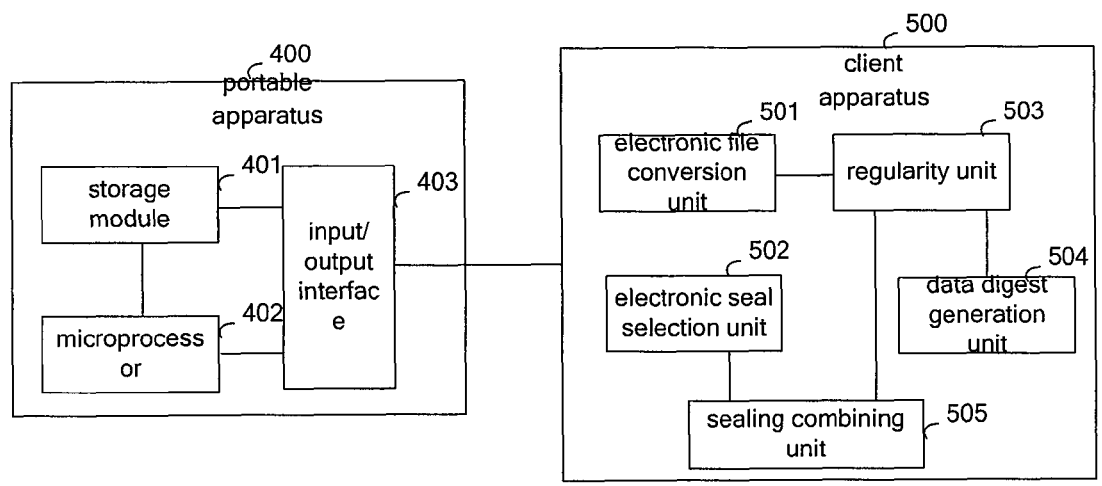
FIG. 4 is a schematic diagram illustrating a structure of an apparatus for implementing an electronic seal according to an embodiment of the present invention.

FIG. 4 is a schematic diagram illustrating a structure of a sealing apparatus according to an embodiment of the present invention. As shown in FIG. 4, the sealing apparatus includes: portable apparatus 400 and client apparatus 500. Portable apparatus 400 includes storage module 401, microprocessor 402 and input/output interface 403. Client apparatus 500 includes file conversion unit 501, electronic seal selection unit 502, regularity unit 503, data digest generation unit 504 and sealing combining unit 505.

Storage unit 401 stores seal data of at least one electronic seal, a digital certificate, electronic signature program, a key generation program and a private key of the sealer, wherein the private key of the sealer is generated by triggering the key generation program in a special way when the seal data is created.

File conversion unit 501 is adapted to convert the file to be sealed into a layout file. Electronic seal selection unit 502 is adapted to select an electronic seal from storage module 401 of portable apparatus 400.

Regularity unit 503 is adapted to regularize the file converted by file conversion unit 501.

Data digest generation unit 504 is adapted to perform a Hash conversion on a regularity result obtained by regularity unit 503 and seal data corresponding to the electronic seal selected by electronic seal selection unit 502 using a predefined Hash function to generate a first data digest, send the generated first data digest to microprocessor 402 through input/output interface 403 of portable apparatus 400.

Microprocessor 402 is adapted to sign the first data digest using the private key and the electronic signature program in storage module 401 to generate an electronic signature result, and send the electronic signature result to sealing combining unit 505 through input/output interface 403.

Sealing combining unit 505 is adapted to combine the electronic signature result generated by microprocessor 402, the regularity result obtained by regularity unit 503, the seal data corresponding to the electronic seal selected by electronic seal selection unit 502, the digital certificate stored in storage module 401 to generate a sealed combination file.

Input/output interface 403 is adapted to exchange data between portable apparatus 400 and client apparatus 500. Input/output 403 may be a wireline USB interface, a serial communication interface, a parallel communication interface, SCSI interface, etc. Input/output 403 may also be a wireless Bluetooth interface, infrared interface, FRID, WAPI, GPRS, CDMA, or SMS, etc. The type of input/output interface 402 should accord with the communication port of client apparatus 500.

Client apparatus 500 may also not include regularity unit 403. Data digest generation unit 504 is adapted to perform a Hash conversion to the file converted by file conversion unit 501 and the seal data corresponding to the electronic seal selected by electronic seal selection unit 502 using a predefined Hash function to generate a first data digest.

Sealing combining unit 505 is adapted to combine the electronic signature result generated by microprocessor 402, the file converted by file conversion unit 501, the seal data corresponding to the electronic seal selected by electronic seal selection unit 502 and the digital certificate in storage module 401 to generate a sealed combination file.

Figure 5:
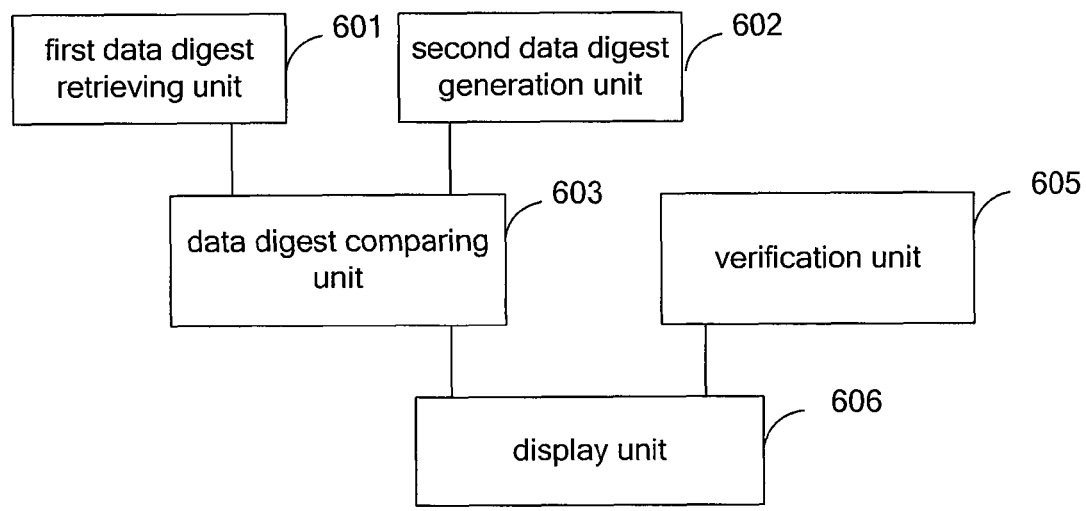
FIG. 5 is a schematic diagram illustrating a structure of an apparatus for verifying an electronic seal according to an embodiment of the present invention.

FIG. 5 is a schematic diagram illustrating a structure of an apparatus for verifying a seal according to an embodiment of the present invention. As shown in FIG. 5, the apparatus includes:

First data digest retrieving unit 601, adapted to decrypt the electronic signature result using the public key of the sealer in the sealed combination file to retrieve the first data digest.

Second data digest generation unit 602, adapted to perform a Hash conversion to the file to be sealed (or the regularity result of the file to be sealed) and the seal data in the sealed combination file using the same Hash function as the sealer to obtain a second data digest.

Data digest comparing unit 603, adapted to compare the generated second data digest with the first data digest to determine whether they are the same.

Verification unit 604, adapted to verify whether the electronic seal is valid.

Display unit 605, adapted to display the sealed file when a compared result of comparing unit 603 and a verification result of verification unit 604 are positive.

In summarize, the portable apparatus is similar to a physical seal in use. By using the method provided by embodiments of the present invention, the validity and integrity of the sealed combination file can be ensured and verified, and the electronic seal made by embodiment of the present invention is ensured to meet all the requirements of the Electronic Signature Law, EU Electronic Signatures Directive and Uniform Electronic Transactions Act.

The invention claimed is:

1. A method for implementing electronic seal, wherein seal data of an electronic seal, a digital certificate, electronic signature program and a private key of a sealer are stored in an external portable apparatus, the method comprises:
   recording the sealing position information; and
   performing a Hash conversion to a file to be sealed and the seal data of the electronic seal, and the sealing position information to generate a data digest, wherein the file to be sealed is a layout file;
   signing, in the portable apparatus, the data digest using the private key of the sealer and the electronic signature program to generate an electronic signature result; and
   combining the file to be sealed, the seal data of the electronic seal, the digital certificate and the electronic signature result to generate a sealed combination file.

2. The method of claim 1, wherein the file to be sealed records position information and referenced resources of basic layout objects in each page of the file.

3. The method of claim 2, wherein the recording of the position information of the basic layout objects in each page of the file comprises:
   recording, in a current coordinate system, coordinates of each basic layout object ; or
   recording coordinates of beginning basic layout object and relative positions of following basic layout objects relative to the beginning basic layout object.

4. The method of claim 2, wherein the basic layout objects comprise characters, graphics and images; the referenced resources comprise image and non-standard font.

5. The method of claim 1, wherein the portable apparatus further comprises a key generation program, adapted to generate a random key pair when creating the seal data; the key pair comprises the private key of the sealer and a public key of the sealer.

6. The method of claim 5, wherein the private key of the sealer is stored in the portable apparatus after being generated and prohibited to be exported.

7. The method of claim 1, wherein the digital certificate comprises a certificate sequence number, a sequence number of the electronic seal and a validity period.

8. The method of claim 7, wherein the digital certificate further comprises a public key of the sealer.

9. The method of claim 1, further comprising:
   before performing the Hash conversion to the file to be sealed and the seal data, performing regularity conversion to the file to be sealed seal data.

10. The method of claim 1, wherein the portable apparatus signs the data digest and time information using the private key of the sealer to generate the electronic signature result.

11. The method of claim 1, wherein the portable apparatus and/or the seal data of the at least one electronic seal are respectively set with an access password;
    the method further comprises: receiving the access password before the sealed combination file is sealed.

12. The method of claim 1, further comprising:
    receiving, by the verifier, the seal combination file;
    decrypting the electronic signature result in the seal combination file using the public key of the sealer to obtain a first data digest;
    performing a Hash conversion with the same method when the sealed combination file is sealed to obtain a second data digest;
    comparing the first data digest and the second data digest; if they are different, determining that the verification fails.

13. The method of claim 12, further comprising:
    comparing a validity period of the electronic seal or validity period of the digital certificate with the time information in the seal combination file and determining whether the electronic seal or digital certificate is during the validity period when the sealed combination file is sealed; if either is out of the validity period, determining that the verification fails.

14. The method of claim 13, further comprising:
    determining whether the electronic seal or digital certificate is registered or revoked; if the electronic seal or digital certificate is not effectively registered or has been revoked, determining that the verification fails.

15. The method of claim 1, further comprising:
    converting, when the file to be sealed is not a layout file, the file to be sealed into a layout file.

16. An electronic seal apparatus, comprising: a portable apparatus, a client apparatus; wherein
    the portable apparatus comprises: a storage module, a microprocessor, an input/output interface; the client apparatus comprises: a data digest generation unit and a sealing combining unit;
    the storage unit is adapted to store seal data of a seal, a digital certificate, electronic signature program and a private key of a sealer; and record sealing position information;
    the data digest generation unit is adapted to perform a Hash conversion to a file to be sealed and the seal data of the electronic seal, and the sealing position information to generate a data digest; wherein the file to be sealed is a layout file;
    the microprocessor is adapted to sign the data digest generated by the data digest generation unit using the private key and the electronic signature program stored in the storage module to generate an electronic signature result;
    the sealing combining unit is adapted to combine the electronic signature result generated by the microprocessor, the seal data of the electronic seal and the digital certificate in the storage module to generate a seal combination file;
    the input/output interface is adapted to implement data exchange between the portable apparatus and the client apparatus.

17. The electronic seal apparatus of claim 16, wherein the client apparatus further comprises:
    a file conversion unit, adapted to convert the file to be sealed into a layout file.

18. The electronic seal apparatus of claim 16, wherein the input/output interface is in accordance with a communication port of the client apparatus; the input/output interface is anyone of: USB interface, serial communication interface, parallel communication interface, SCSI, wireless Bluetooth, infrared, RFID, WAPI, GPRS, CDMA, SMS.

19. A client apparatus, comprising:
  a data digest generation unit, adapted to perform a Hash conversion to a file to be sealed and a seal data of a electronic seal, and sealing position information recorded to generate a data digest; wherein the file to be sealed is a layout file and the seal data of a electronic seal is stored in a portable apparatus;
  a sealing combining unit, adapted to combine an electronic signature result generated through signing the data digest generated by the data digest generation unit using a private key and electronic signature program stored in the portable apparatus, as well as the seal data of the electronic seal and a digital certificate stored in the portable apparatus to generate a seal combination file.

* * * * *